US007392826B2

(12) United States Patent
Schub et al.

(10) Patent No.: US 7,392,826 B2
(45) Date of Patent: Jul. 1, 2008

(54) VALVE DEVICE AND MULTIPORT REGULATING ASSEMBLY COMPRISING A PLURALITY OF SUCH DEVICES

(75) Inventors: Arnaud Schub, Ingersheim (FR); Michel Andres, Mulhouse (FR)

(73) Assignee: Mark IV Systems Moteurs Societe Anonyme, Courbevoie (FR)

( * ) Notice: Subject to any disclaimer, the term of this patent is extended or adjusted under 35 U.S.C. 154(b) by 146 days.

(21) Appl. No.: 10/865,396

(22) Filed: Jun. 10, 2004

(65) Prior Publication Data

US 2005/0016602 A1 Jan. 27, 2005

(30) Foreign Application Priority Data

Jun. 10, 2003 (FR) .................................. 03 06930

(51) Int. Cl.
*E03B 1/00* (2006.01)
*F16K 1/22* (2006.01)
*F02D 9/08* (2006.01)

(52) U.S. Cl. ............................ 137/601.17; 137/601.09; 251/306; 123/337

(58) Field of Classification Search ......... 251/305–308, 251/173, 175; 123/336, 337, 338; 137/601.09, 137/601.01, 601.17
See application file for complete search history.

(56) References Cited

U.S. PATENT DOCUMENTS

| | | | | |
|---|---|---|---|---|
| 2,816,729 | A * | 12/1957 | Jensen | 251/306 |
| 5,098,064 | A | 3/1992 | Daly et al. | |
| 5,181,492 | A * | 1/1993 | Sausner et al. | 123/337 |
| 5,681,025 | A * | 10/1997 | Kuhn et al. | 251/306 |
| 5,979,871 | A * | 11/1999 | Forbes et al. | 251/305 |
| 6,039,069 | A * | 3/2000 | Gonsior | 251/305 |
| 6,135,418 | A * | 10/2000 | Hatton | 251/306 |
| 6,138,640 | A * | 10/2000 | Asanuma et al. | 123/337 |
| 6,491,020 | B2 * | 12/2002 | Kotchi et al. | 123/337 |
| 6,554,250 | B2 * | 4/2003 | Alves et al. | 251/305 |
| 6,598,854 | B1 * | 7/2003 | Jessberger et al. | 251/305 |
| 6,722,335 | B2 * | 4/2004 | Nomura et al. | 123/184.59 |
| 6,793,197 | B2 * | 9/2004 | DePenning et al. | 251/305 |

(Continued)

FOREIGN PATENT DOCUMENTS

DE 198 19 364 A1 11/1999

(Continued)

*Primary Examiner*—John Rivell
*Assistant Examiner*—Cloud K Lee
(74) *Attorney, Agent, or Firm*—Gottlieb, Rackman & Reisman

(57) ABSTRACT

The present invention relates to a valve device for regulating a fluid, particularly a gaseous fluid, in a conduit portion, comprising a valve body fixed to a support spindle extending transversely into said portion and mounted with the ability to rotate therein, said conduit portion comprising, on either side of said spindle, opposing internal steps forming two bearing surface portions for corresponding edge parts of said valve body, in the closure position thereof, each step extending substantially over approximately half of the internal circumference of the conduit portion in the region of the mounting position of the support spindle.

Device characterised in that the opposing edge parts of the plate-shaped valve body comprise deformable sealing means for operation thereof in the closure position of said valve body, in the form of two flexible lips extending from said edge parts asymmetrically on either side of said valve body and at an inclination to the plane of the valve body, a first toward the exterior and the second toward the interior.

16 Claims, 6 Drawing Sheets

U.S. PATENT DOCUMENTS

| | | | | |
|---|---|---|---|---|
| 2002/0108601 | A1 * | 8/2002 | Dietz et al. ................. | 123/336 |
| 2002/0117646 | A1 * | 8/2002 | Jessberger et al. .......... | 251/305 |

FOREIGN PATENT DOCUMENTS

| | | | | |
|---|---|---|---|---|
| EP | 1 028 238 | A2 | | 8/2000 |
| JP | 07279696 | | | 10/1995 |
| JP | 07279696 | A | * | 10/1995 |
| WO | WO 01/20180 | A1 | | 3/2001 |

* cited by examiner

VALVE DEVICE AND MULTIPORT REGULATING ASSEMBLY COMPRISING A PLURALITY OF SUCH DEVICES

BACKGROUND OF THE INVENTION

The present invention relates to the field of the control and regulation of the flow of fluids, particularly gaseous fluids, and in particular within the scope of air intake systems for internal combustion engines, for example with regard to intake manifolds or distributors.

The subject of the present invention is a valve-type regulating device, a multiport regulating assembly comprising a plurality of such devices and a method of producing an intake manifold comprising such an assembly.

Many valve devices are already known for regulating the flow rate or varying the flow of a fluid in a conduit, tube or the like.

Thus in the French Patent Application No. 2 805 878 in the name of the applicant, a valve device is proposed in which the valve body, in the closure position, is supported on internal steps in the region of the passage receiving said device and the passage from the open state to the closed state of said device being obtained by limited pivoting of said valve body.

Nevertheless, the possibility of displacing the valve body into a closure position whilst maintaining the seal is very limited and does not allow compensation to be made for possible play in the region of the control.

Such play is frequently present in regulating assemblies containing several valve devices controlled simultaneously by a single control unit.

SUMMARY OF THE INVENTION

The object of the present invention in particular is to overcome the aforementioned limitation.

To this end, its principal subject is a valve device for regulating a fluid, particularly gaseous fluids, in a conduit portion, comprising a valve body fixed to a support spindle extending transversely into said portion and mounted with the ability to rotate therein, said conduit portion comprising, on either side of said spindle, opposing internal steps forming two bearing surface portions for corresponding edge parts of said valve body in the closure position thereof, each step extending substantially over approximately half of the internal circumference of the conduit portion in the region of the mounting position of the support spindle and said steps advantageously being offset on either side of the plane perpendicular to the direction of circulation of fluid in said portion and containing said support spindle, in such a manner that the pivot angle of the valve body between its maximum open position and its closure position is less than 90°, the device being characterised in that the opposing edge parts of the plate-shaped valve body comprise deformable sealing means, for operation thereof in the closure position of said valve body, in the form of two flexible lips extending from said edge parts asymmetrically on either side of said valve body and at an inclination to the plane of the valve body, a first lip toward the exterior and the second lip toward the interior.

BRIEF DESCRIPTION OF THE DRAWINGS

The invention will be better understood with reference to the following description which relates to a preferred embodiment, given as a non-limiting example and explained with reference to the accompanying diagrammatic drawings, in which.

DETAILED DESCRIPTION OF THE INVENTION

Figure 1:
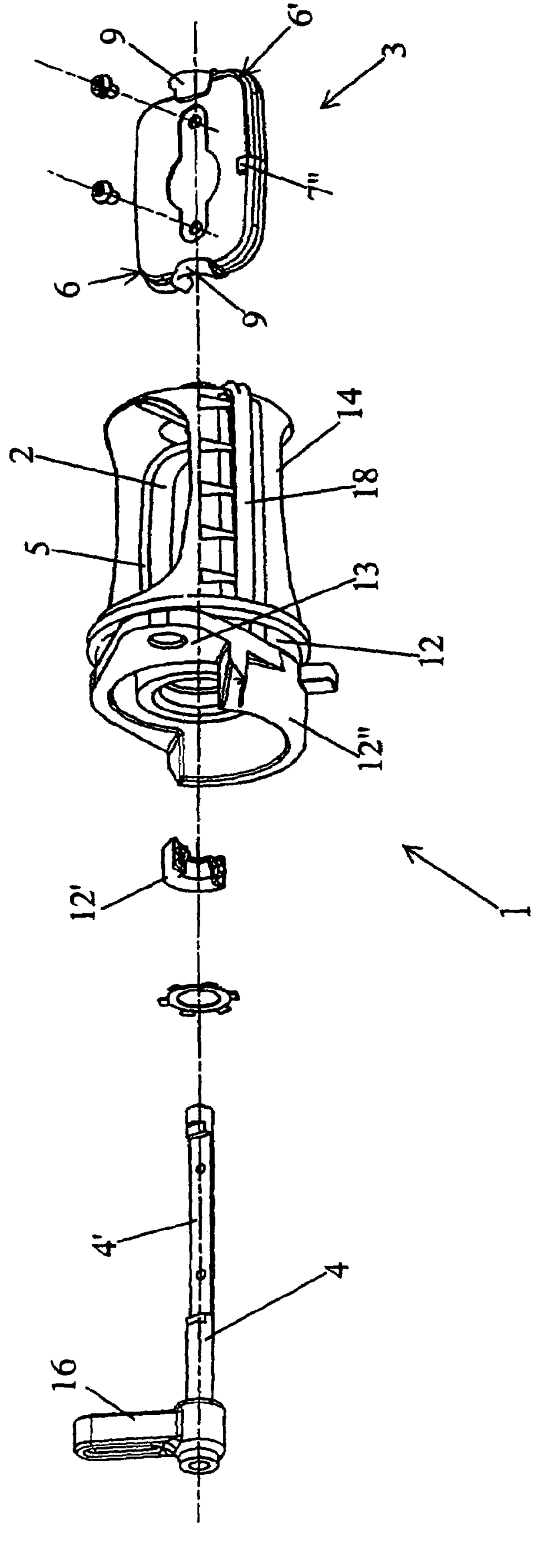
FIG. 1 is an exploded view in perspective of a valve device according to the invention.

As the figures in the accompanying drawings show, the invention relates to a valve device 1 for regulating a fluid, particularly a gaseous fluid, in a conduit portion 2, comprising a valve body 3 attached to a support spindle 4 extending transversely into said portion and mounted with the ability to rotate therein, said conduit portion 2 comprising, on either side of said spindle 4, opposing internal steps 5, 5' forming two bearing surface portions for corresponding edge parts 6, 6' of said valve body 3, in the closure position thereof, each step 5, 5' substantially extending over approximately half of the internal circumference of the conduit portion 2 in the region of the mounting position of the support spindle 4. Advantageously, said steps 5 and 5' are offset on either side of the perpendicular plane P in the direction D of circulation of the fluid in said portion 2 and containing said support spindle 4 in such a manner that the pivot angle of the valve body 3 between its maximum open position (minimal pressure loss caused by the valve body 3—positioned along its edge in the direction D) and its closure position (stopper of the passage passing through the conduit portion 3) is less than 90°.

According to the invention, the opposing edge parts 6, 6' of the plate-shaped valve body 3 comprise flexible sealing means 7, 7' for operation thereof in the closure position of said valve body 3, in the form of two flexible lips extending from said edge parts 6, 6' asymmetrically on either side valve body 3 and at an inclination to the plane of the valve body 3, a first lip 7 toward the exterior and the second lip 7' toward the interior. In particular, first lip 7 extends outwards from a peripheral edge of the corresponding edge part (6).

With the aforementioned measures it is possible to guarantee a sealed enclosure within a determined angular range of rotation of the support spindle 4 between a minimum closure position (when the flexible lips 7 and 7' barely come into contact with the corresponding bearing surfaces 5 and 5') and a maximum closure position (when said flexible lips 7 and 7' are deformed to their maximum extent).

Furthermore, the creation of a seal in the region of the surfaces of the internal steps relative to the internal wall of the conduit portion 3 enables any contact and therefore any friction between the lips 7 and 7' and said internal wall to be avoided, a seal only being obtained from the moment when said lips come into contact with said bearing surfaces.

Furthermore, the unsymmetrical production of the lips 7 and 7' together with the corresponding orientations of the steps forming bearing surface portions 5 and 5', when fluid is sucked in the direction of circulation D in the closure position of the valve 3, results in a pivoting torque tending to reinforce said seal by increased deformation of the lips 7 and 7'.

Figure 2:
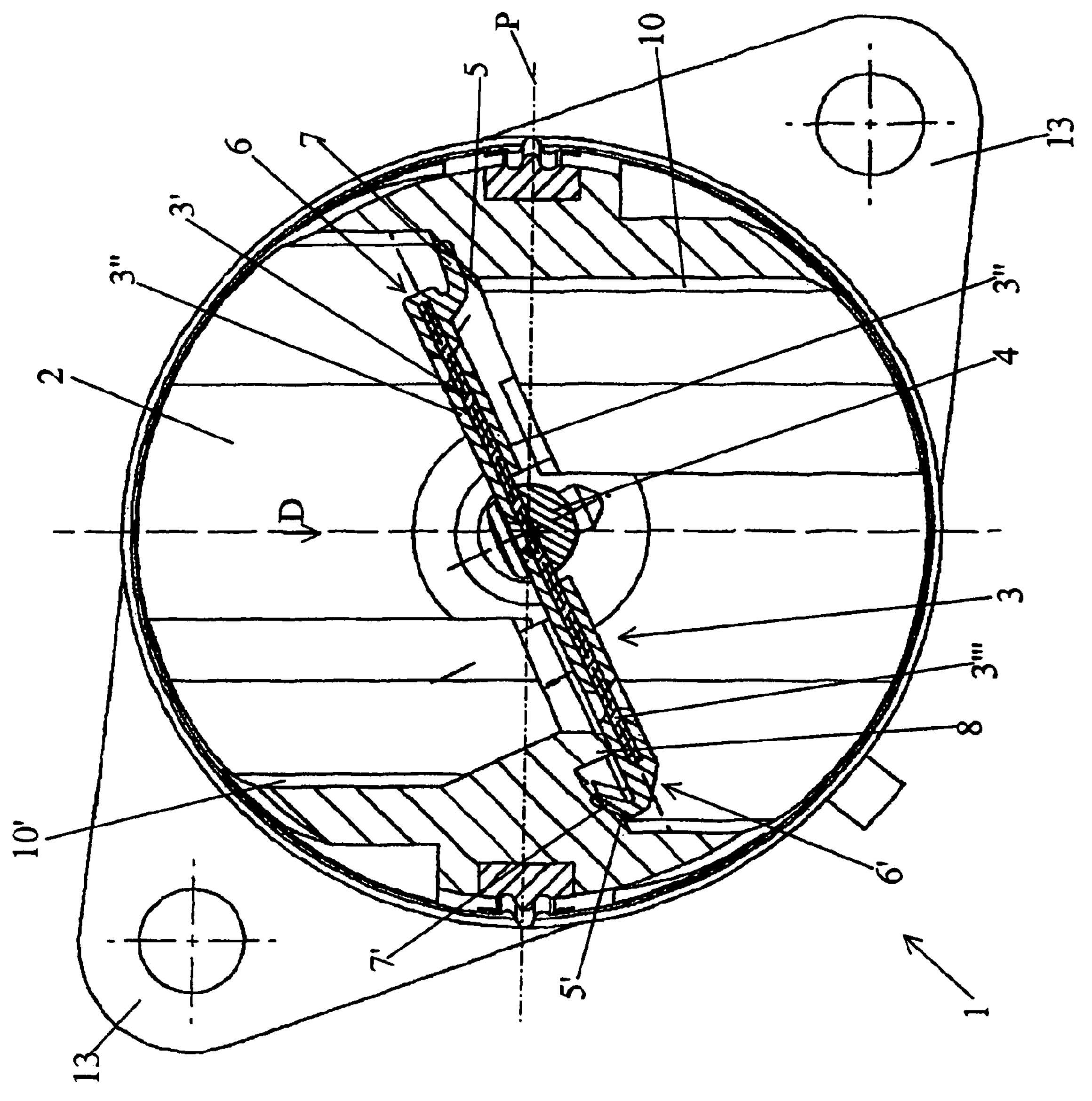
FIG. 2 is a transverse sectional view (on a different scale) in the region of the passage of the conduit portion of the valve device according to the invention (in a substantially closed position)
Figure 3A:
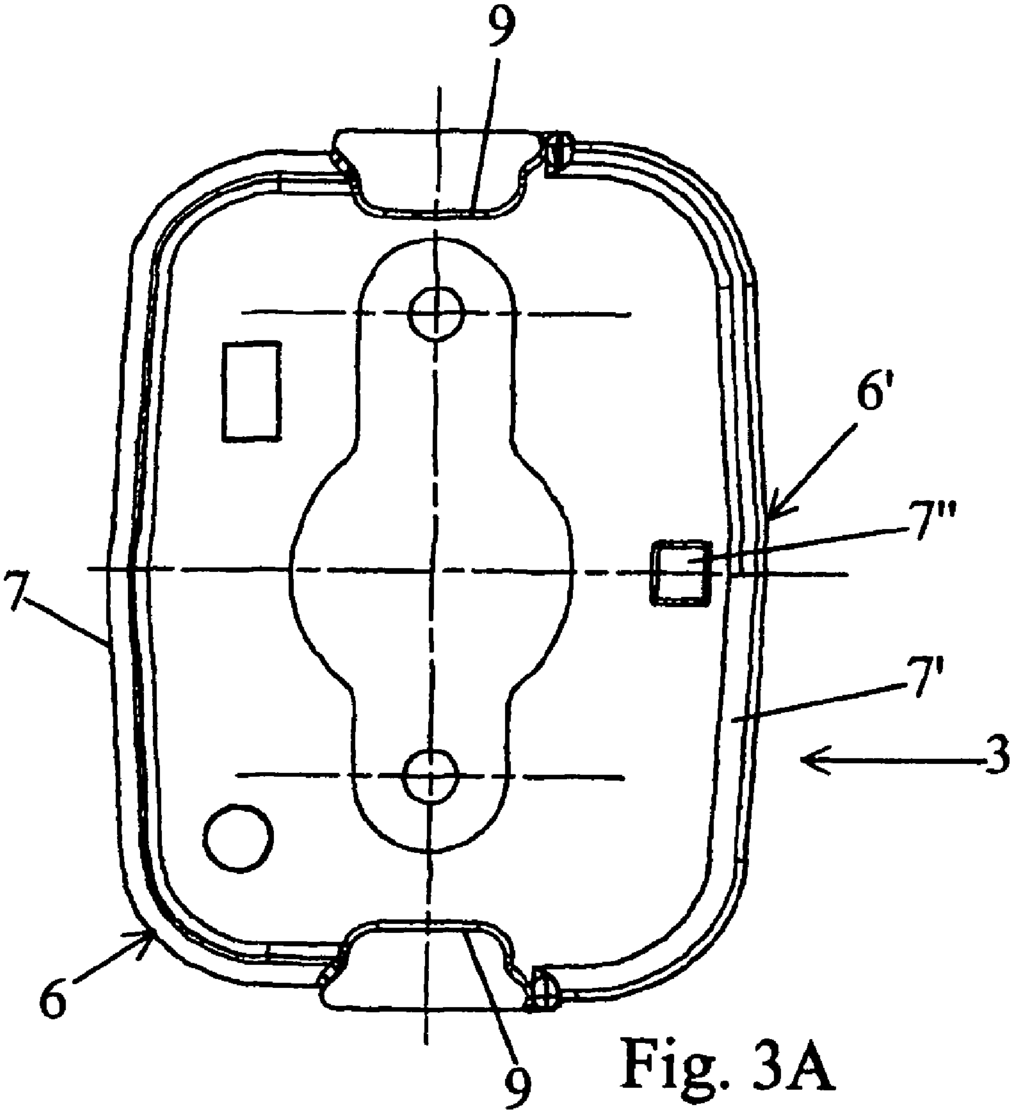
FIGS. 3A and 3B are respectively a side elevation and a transverse section of a valve body forming part of the device in FIGS. 1 and 2.
Figure 3B:
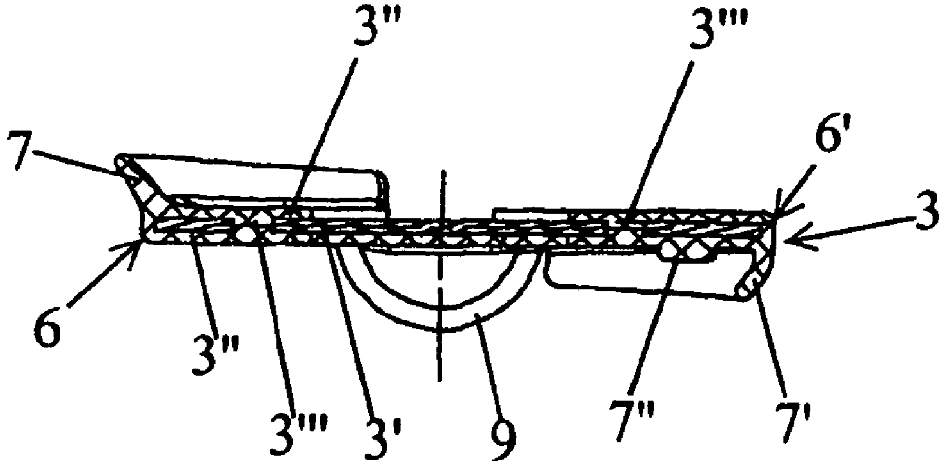
Figure 4A:
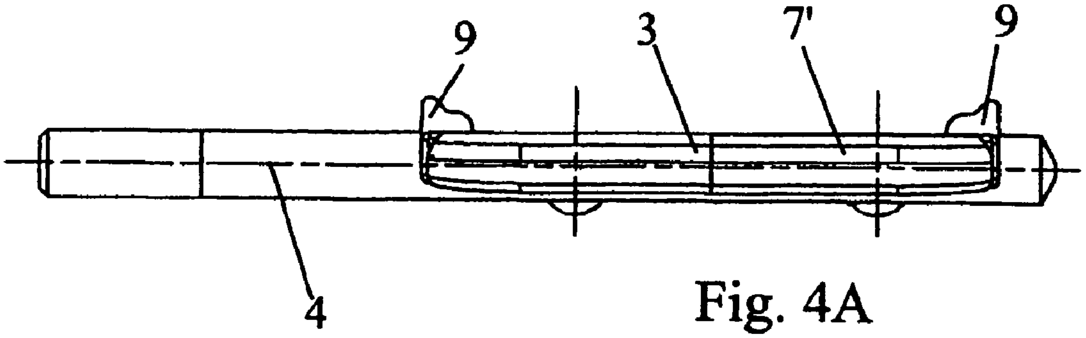
FIGS. 4A and 4B are respectively a side elevation (along the edge) and a plan view of an assembly [valve body/support and control spindle] forming part of the device in FIGS. 1 and 2.
Figure 4B:
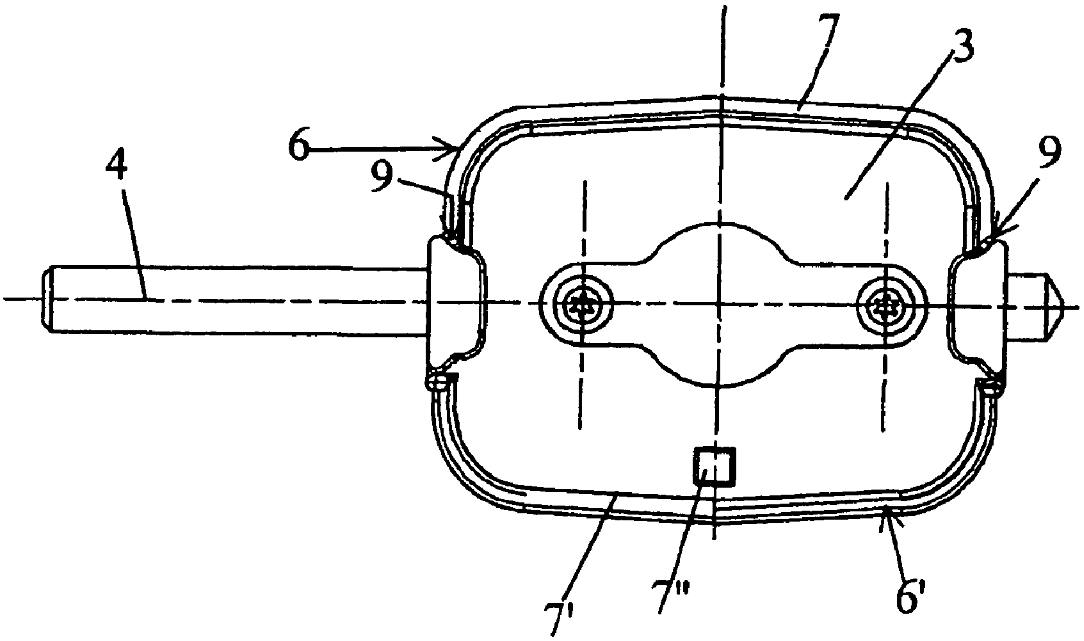

According to a preferred embodiment of the invention, revealed in particular in FIG. 2 and FIG. 3B of the accompanying drawings, the two planar bearing surface portions 5 and 5' are contained in respective parallel planes, offset relative to one another in the direction D of circulation of the fluid and inclined relative to the plane P. Furthermore, in the closure position, under pressure, of the valve body 3, the first lip 7 is elastically deformed by bending toward the exterior and the second lip 7' is elastically deformed by bending toward the interior, in the direction of the corresponding face of the valve body 3 by each being supported on a corresponding surface portion 5, 5' a continuation of the pivoting movement of the valve body 3, after a first contact of the lips 7, 7' with the bearing surface portions 5, 5', leading to an increase in the areas of said lips 7, 7' in contact with said portions and in the contact pressure.

According to an advantageous variant of the invention, the valve body 3 consists of a plate 3' made of a rigid material covered, by overmoulding, with a flexible and elastic material 3" from which the two lips 7, 7' are also formed in one piece in the form of edges, one of which 7 extends laterally in an inclined manner toward the exterior from one of the faces of one of the edge parts 6 and the other of which 7' extends laterally in an inclined manner toward the interior from the opposite face of the other of the edge parts 6'.

In order to obtain a strong and close attachment of the flexible material 3" to the plate 3' it can be advantageously provided to equip the plate 3' of the valve body 3 with a plurality of perforations or openings 3'", passed through by flexible material bridges connecting the overmoulded layers or parts of layers covering the opposing faces of said valve body 3.

Furthermore, the flexible material 3" can form, in the region of the support spindle portions 4 situated between the lateral edges of the plate 3' and the areas of the internal wall opposite the conduit portion 2, sealing flanges 9 which take part in the stopper of the passage through said conduit portion 2, at least in the closure position of the valve body 3. To limit the loss of pressure in the open position of the valve body, the sealing flanges 9 only extend over half of the periphery of the aforementioned support spindle portions 4, their visible surfaces in the direction D of circulation of the fluid being at their greatest in the closure position of the valve body 3.

Said sealing flanges 9 will produce, in particular, in the closure position of the valve body 3, a sealing of the passages defined by the lateral edges of said body 3, the steps 5 and 5' and the internal wall parts of the conduit portion 2, and in which the aforementioned support spindle portions 4 are situated.

In order to avoid damage to the lips 7 and 7' detrimental to a good seal in the closure position, the device advantageously comprises an abutment means 8 preferably formed in one piece with the conduit portion 2, limiting the pivoting movement of the valve body 3 in the direction of sealing and defining a maximum closure position therefor, so as to avoid excessive deformation of the lips 7, 7'.

This abutment means 8 can for example consist of a protruding pin or nose formed in the region of one of the steps 5, 5' (see in particular FIGS. 2 and 5A) on which a local excess thickness 7" in the layer of flexible material 3" (see in particular FIGS. 1, 3A, 3B and 4B) or possibly a localised deformation of the plate 3' is supported.

Furthermore, at least one means 10, 10' can be provided to limit the pivoting of said body 3 in the opposite direction, advantageously in a rotational position located slightly beyond the maximum open position, for example in the form of a step or two opposing steps formed on the internal wall of said conduit portion 3, on which the lateral edges of the valve body 3 can be supported in the region of their faces opposite the faces carrying the lips 7 and 7'.

The support spindle 4 can consist of a metal rod portion equipped with a flattened region 4' onto which is fixed, for example by riveting, by snap riveting or welding, the plate 3 in the form of a small metal plate, the flexible material 3" consisting of a silicone-based elastomer, for example of the type known by the name.

According to an advantageous embodiment of the invention, the passage section of the conduit portion 2, at least in the region of the position for mounting the valve body 3/support spindle 4 assembly and the valve body 3 have a rectangular form with rounded corners.

According to a preferred embodiment of the invention, providing a ready-to-use functional subassembly, the valve device 1 consists of a module to be inserted or a preassembled cassette comprising, in addition to the valve body 3/support spindle 4 assembly, a structural body comprising a part 12 forming a stopper, equipped with at least one fixing flange 13 and extended by a perforated part 14 of a generally annular structure, providing at least the internal wall of a conduit portion 2 in the region of the mounting position of the valve body 3/support spindle 4 assembly and the steps forming seats 5, 5' for the edge parts 6, 6' of said valve body 3, said perforated part 14 comprising opposing guide bearings 15, 15' for the support spindle 4, one of said guide bearings also extending through the part 12 forming a stopper and the support spindle part 4 extending beyond the latter being fixed to a rotary-drive part or member 16, such as for example a small connecting rod (FIG. 1).

The guide bearing situated in the part 12 forming a stopper could in particular comprise a seal with annular lips 12' creating an axial seal around the support spindle 4.

The part 12 forming a stopper could comprise, in addition to two fixing flanges 13 in the form of lugs provided with apertures for the passage of fixing screws, also an abutment means 12" for the small connecting rod 16 in two extreme positions of rotation of the support spindle 4 (FIGS. 1 and 5).

In order to allow adjustable mounting with centering, the external faces of the parts 12 and 14 are preferably supported by a cylindrical surface with a slightly truncated extension, from the part 12 in the form of a stopper, sealing means 17, 18 being attached to said faces to ensure a circumferential peripheral seal in the region of said part 12 in the form of a stopper and on the external periphery of the annular part 14.

Figure 5B:
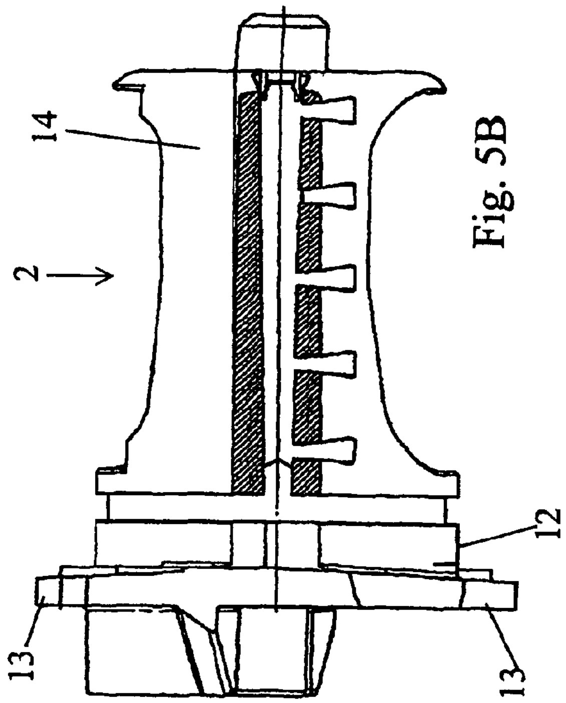
FIGS. 5A, 5B and 5C are respectively views in perspective, side elevation and section along the axial plane of the structural body forming part of the valve device in FIGS. 1 and 2, and, FIG. 6 is a partially exploded perspective view of a multiport regulating assembly comprising a plurality of devices according to the invention and mounted in an intake manifold.
Figure 5C:
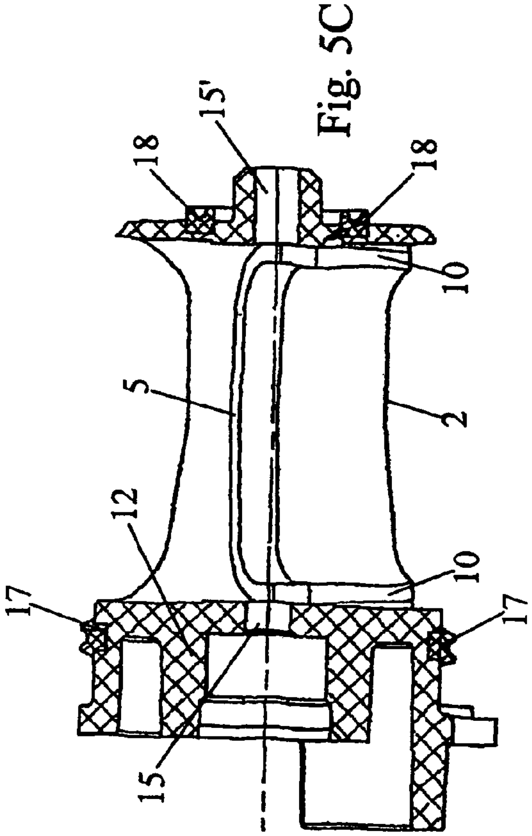
Figure 5A:
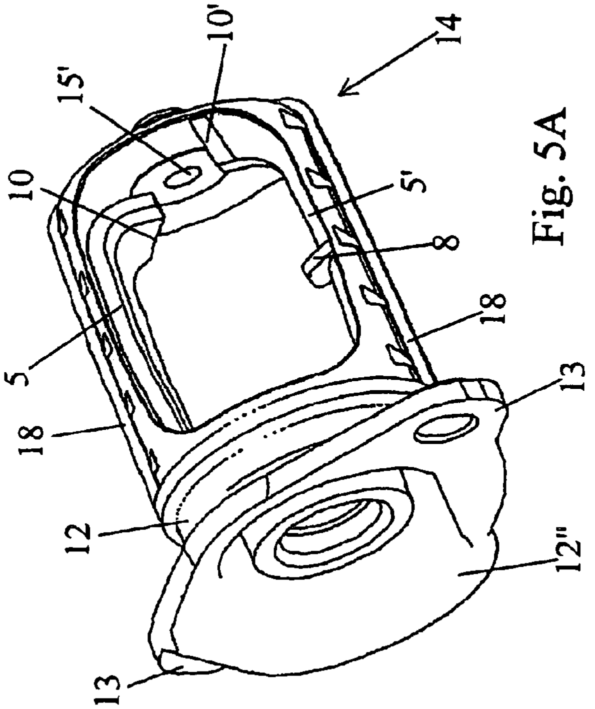

As FIG. 5C more particularly shows relative to FIGS. 1, 5A and 5B, sealing means 17, 18 consist of double-lipped seals attached by overmoulding and adjoining one another.

To increase the force of attachment of the sealing means 17 and 18 on the parts 12 and 14, the latter can be provided with recesses forming special anchoring sites for said seals 17, 18.

Figure 6:
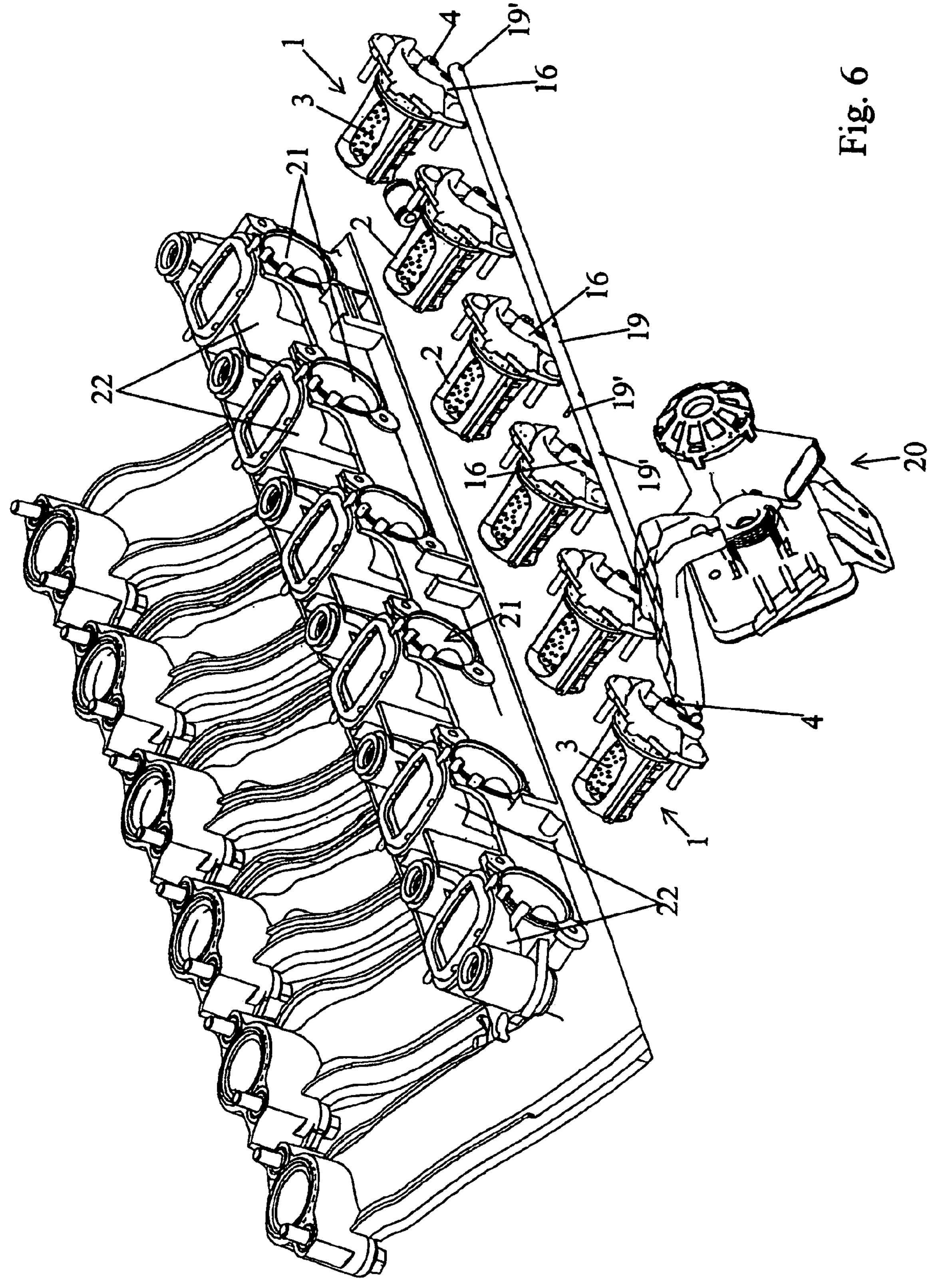

The present invention also relates, as shown in FIG. 6, to a multiport regulating assembly to control the circulation of a gaseous fluid in a plurality of conduits simultaneously, in particular in a plurality of tubes of an intake manifold in an internal combustion engine, characterised in that it consists of a plurality of valve devices 1 such as described above and shown in the accompanying figures, of which the respective valve body 3/support spindle 4 assemblies are controlled in position by a single control rod 19, functionally attached to an actuator 20, said devices 1 being mounted in an indexed manner in a sealed manner in transverse housings 21 produced in said conduits 22 with the support spindles 4 situated in a plane perpendicular to the directions of flow of the fluid in said conduits 22 and with the internal walls of the perforated parts 14 of the different devices 1 flush-mounted and adjoining the internal walls of the respective conduits receiving them.

The control rod 19 comprises a plurality of drive points 19', such as lugs, recesses, protuberances or the like, spaced along said rod and each engaging with a rotary-drive part 16 on a control spindle 4.

The control rod 19, the drive points 19', the actuator 20 and the parts 12 in the form of a stopper of the valve devices 1 could for example be produced in the manner described and shown in the French Patent No. 2 793 539 in the name of the applicant.

Finally, the invention also relates to a method of producing an intake manifold comprising at least two tubes of which the circulation flow is controlled and equipped with a multiport regulating assembly such as described above (cf FIG. 6).

This method essentially consists in producing at least one, and preferably a plurality of, manifold(s) provided with transverse housings 21 for receiving and mounting valve devices 1 of the aforementioned assembly, by means of the production method for mass-producing these manifolds, in measuring the deformations and play affecting the manifolds thus produced, in particular in the region of said transverse housings 21, in mass-producing the manifolds, the valve devices and control rods, the latter by taking into account the results of the aforementioned measures for the location of drive points 19' and finally, in mounting on each manifold the valve devices 1 and a corresponding control rod 19.

Due to these measures for the production method and the capacity for significant deformation of the sealing means 7 and 7' of the valve bodies 3 of the various devices 1, it is possible to compensate for the production tolerances associated with mass-production and to guarantee optimal joining of the various components of the multiport regulating assembly and a good seal in the region of each valve device 1 in the closure position of said assembly, despite their simultaneous mechanical control.

Of course, the invention is not limited to the embodiment disclosed and shown in the accompanying drawings. Modifications remain possible, in particular from the point of view of the constitution of the various elements or by substitution of technical equivalents, without nevertheless departing from the scope of the invention.

The invention claimed is:

1. A valve device for regulating a gaseous fluid, in a conduit portion, comprising a valve body attached to a support spindle extending transversely into said portion and mounted to rotate therein between open and closure positions, said conduit portion comprising, on either side of said spindle, opposing internal steps forming two bearing surface portions for corresponding edge parts of said valve body, when said valve body is in the closure position, each step extending substantially over approximately half of the internal circumference of the conduit portion in the region of the mounting position of the support spindle and said steps being offset on either side of the plane perpendicular to the direction of circulation of the fluid in said portion and containing said support spindle such that the pivot angle of the valve body between its maximum open position and its closure position is less than 90° wherein said valve body has two opposite surfaces, each surface having a respective edge part (6, 6') that include deformable sealing means (7, 7'), for operation thereof in the closure position of said valve body (3), said sealing means defining first and second flexible lips extending in opposite directions from said edge parts (6, 6') on the surfaces of said valve body (3) and at an inclination to the plane of the valve body (3), the first lip (7) extending toward the exterior and the second lip (7') extending toward the interior, wherein said first lip (7) extends outwards from a peripheral edge of the corresponding edge part (6).

2. A device according to claim 1, wherein the two planar bearing surface portions (5 and 5') are contained in respective parallel planes, offset relative to one another in the direction (D) of circulation of the fluid and inclined relative to the plane (P) and in that, in the closure position, under pressure, of the valve body (3), the first lip (7) is elastically deformed by bending toward the exterior and the second lip (7') is elastically deformed by bending toward the interior, in the direction of the corresponding face of the valve body (3), each being supported on a corresponding surface portion (5, 5'), a continuation of the pivoting movement of the valve body (3) after a first contact of the lips (7, 7') with the bearing surface portions (5, 5'), leading to an increase in the areas of said lips (7, 7') in contact with said portions and in the contact pressure.

3. A device according to claim 1, wherein the valve body (3) consists of a plate (3') made of a rigid material covered, by overmoulding, with a flexible and elastic material (3") from which the two lips (7, 7') are also formed in one piece in the form of edges, one of which (7) extends laterally in an inclined manner toward the exterior from one of the faces of one of the edge parts (6) and the other of which (7') extends laterally in an inclined manner toward the interior from the opposing face of the other of the edge parts (6').

4. A device according to claim 3, wherein the plate (3') of the valve body (3)is equipped with a plurality of perforations or openings (3''') passed through by flexible material bridges connecting the overmoulded layers or parts of layers covering the opposing faces of said valve body (3) and in that the flexible material (3") forms, in the region of the support spindle portions (4) situated between the lateral edges of the plate (3') and the areas of the internal wall opposite the conduit portion (2), sealing flanges (9) which take part in the stopper of the passage through said conduit portion (2), at least in the closure position of the valve body (3).

5. A device according to claim 3, wherein the support spindle (4) consists of a metal rod portion equipped with a flattened region (4') onto which is fixed the plate (3') in the form of a small metal plate, the flexible material (3") consisting of a silicone-based elastomer.

6. A device according to claim 1, further comprising an abutment means (8), formed in one piece with the conduit portion (2), said abutment means limiting the pivoting movement of the valve body (3) in the direction of sealing and defining a maximum closure position therefor, so as to avoid excessive deformation of the lips (7, 7'), at least one means (10, 10') of limiting the pivoting of said body (3) in the opposite direction, in a position in rotation situated slightly beyond the maximum open position, said abutment means including at least one step formed on the internal wall of said conduit portion (3).

7. A device according to claim 1, wherein the passage section of the conduit portion (2) at least in the region of the position for mounting the valve body (3)/support spindle (4) assembly and the valve body (3) have a rectangular form with rounded corners.

8. A device according to claim 1, comprising, in addition to the valve body (3)/support spindle (4) assembly a structural body comprising a part (12) forming a stopper, equipped with at least one fixing flange (13) and extended by a perforated part (14) of a generally annular structure, providing at least the internal wall of a conduit portion (2) in the region of the mounting position of the valve body (3)/support spindle (4) assembly and the steps forming seats (5, 5') for the edge parts (6, 6') of said valve body (3), said perforated part (14) comprising opposing guide bearings (15, 15') for the support spindle (4), one of said guide bearings also extending through the part (12) forming a stopper and the support spindle part (4) extending beyond the latter being fixed to a rotary-drive part or member (16).

9. A device according to claim 8, wherein the external faces of the parts (12 and 14) are supported by a cylindrical surface with a slightly truncated extension from the part (12) in the form of a stopper, sealing means (17,18) being attached to said faces to ensure a circumferential peripheral seal in the region of said part (12) in the form of a stopper and on the external periphery of the annular part (14).

10. A device according to claim 9, wherein the sealing means (17, 18) consist of double-lipped seals attached by overmoulding and adjoining one another.

11. A device according to claim 8, wherein said valve is part of a multiport regulating assembly to control the circulation of a gaseous fluid in a plurality of conduits simultaneously, in a plurality of tubes of an intake manifold in an internal combustion engine, said regulating assembly including of a plurality of valve devices (1) of which the respective valve body (3)/support spindle (4) assemblies are controlled in position by a single control rod (19) functionally attached to an actuator (20), said devices (1) being mounted in an indexed manner and in a sealed manner in transverse housings (21) produced in said conduits (22) with the support spindles (4) situated in a plane which is perpendicular to the directions of flow of the fluid in said conduits (22) and with the internal walls of the perforated parts (14) of the different devices (1) flush-mounted and adjoining the internal walls of the respective conduits receiving them.

12. A device according to claim 11, wherein the control rod (19) comprises a plurality of drive points (19'), spaced along said rod and each engaging with a rotary-drive part (16) of a control spindle (4).

13. A device according to claim 11, wherein said drive point includes a lug.

14. A device according to claim 11, wherein said drive point includes a recess.

15. A device according to claim 11, wherein said drive point includes a protuberance.

16. A valve device for regulating a gaseous fluid, in a conduit portion, comprising a valve body attached to a support spindle extending transversely into said portion and mounted to rotate therein between open and closure positions, said conduit portion including, on either side of said spindle, opposing internal steps forming two bearing surface portions for corresponding edge parts of said valve body, when said valve body is in the closure position, each step extending substantially over approximately half of the internal circumference of the conduit portion in the region of the mounting position of the support spindle and said steps being offset on either side of the plane perpendicular to the direction of circulation of the fluid in said portion and containing said support spindle such that the pivot angle of the valve body between its maximum open position and its closure position is less than 90°, wherein said valve body has two opposite surface with respective edge parts (6, 6') are disposed thereon, said edge parts including respective deformable sealing means (7, 7'), for operation thereof in the closure position of said valve body (3), said sealing means defining first and second flexible lips extending from said edge parts (6, 6') asymmetrically on either side of said valve body (3) and at an inclination to the plane of the valve body (3), the first lip (7) extending outwardly from a corresponding edge of the corresponding edge part (6) toward the exterior and the second lip (7') extending toward the interior, the first and second lips not contacting the conduit portion except at the steps to minimize friction with the conduit portion as the valve body moves between the open and closure positions.

* * * * *

UNITED STATES PATENT AND TRADEMARK OFFICE

CERTIFICATE OF CORRECTION

PATENT NO. : 7,392,826 B2
APPLICATION NO. : 10/865396
DATED : July 1, 2008
INVENTOR(S) : Arnaud Schub et al.

It is certified that error appears in the above-identified patent and that said Letters Patent is hereby corrected as shown below:

Front page,

Item (73) Assignee:

Change “Mark IV Systems Moteurs Societe Anonyme” to -- Mark IV Systemes Moteurs Societe Anonyme --

Signed and Sealed this

Twenty-first Day of April, 2009

JOHN DOLL
*Acting Director of the United States Patent and Trademark Office*